United States Patent
Ashjaee et al.

(10) Patent No.: US 9,250,328 B2
(45) Date of Patent: Feb. 2, 2016

(54) GRAPHICS-AIDED REMOTE POSITION MEASUREMENT WITH HANDHELD GEODESIC DEVICE

(75) Inventors: Javad Ashjaee, Saratoga, CA (US); Mikhail Gribkov, Moscow (RU); Lev Rapoport, Moscow (RU)

(73) Assignee: Javad GNSS, Inc., San Jose, CA (US)

( * ) Notice: Subject to any disclaimer, the term of this patent is extended or adjusted under 35 U.S.C. 154(b) by 480 days.

(21) Appl. No.: 12/571,244

(22) Filed: Sep. 30, 2009

(65) Prior Publication Data

US 2011/0075886 A1     Mar. 31, 2011

(51) Int. Cl.

| | |
|---|---|
| G06K 9/00 | (2006.01) |
| G01S 19/14 | (2010.01) |
| G01C 15/06 | (2006.01) |
| G01C 15/08 | (2006.01) |
| G06T 7/00 | (2006.01) |
| G01C 11/30 | (2006.01) |
| G01S 19/01 | (2010.01) |
| G01C 15/00 | (2006.01) |
| G01C 15/02 | (2006.01) |

(Continued)

(52) U.S. Cl.
CPC ............... *G01S 19/14* (2013.01); *G01C 11/02* (2013.01); *G01C 11/30* (2013.01); *G01C 15/002* (2013.01); *G01C 15/02* (2013.01); *G01C 15/06* (2013.01); *G01C 15/08* (2013.01); *G01C 21/005* (2013.01); *G01S 19/01* (2013.01); *G06T 7/004* (2013.01); *G06T 7/0022* (2013.01)

(58) Field of Classification Search
USPC ......... 382/100, 103, 106, 107, 307, 312, 313, 382/321, 325; 342/104, 106–109, 118, 123, 342/126, 139–147, 175, 176, 179, 350, 352, 342/357.2, 357.22–357.44, 357.63–357.65, 342/357.71, 450, 458, 462

See application file for complete search history.

(56) References Cited

U.S. PATENT DOCUMENTS

| | | | | |
|---|---|---|---|---|
| 4,807,158 | A | * | 2/1989 | Blanton et al. ................. 345/581 |
| 5,467,271 | A | * | 11/1995 | Abel ..................... A01B 79/005 702/5 |
| 5,471,218 | A | | 11/1995 | Talbot et al. |

(Continued)

FOREIGN PATENT DOCUMENTS

| | | |
|---|---|---|
| EP | 1189021 A1 | 3/2002 |
| EP | 1645846 A1 | 4/2006 |

(Continued)

OTHER PUBLICATIONS

Extended European Search Report Received for European Patent Application No. 10183800.1, mailed on Dec. 3, 2010, 6 Pages.

(Continued)

*Primary Examiner* — Eric Rush
(74) *Attorney, Agent, or Firm* — Morrison & Foerster LLP

(57) ABSTRACT

A graphics-aided geodesic device is provided. The device may include a display, camera, distance meter, GNSS (Global Navigation Satellite System, including GPS, GLONASS, and Galileo) receiver and antenna, and horizon sensors. Data from the camera and horizon sensors may be displayed to assist the user in positioning the device over a point of interest. In one example, the distance meter may be used to determine the position of the point of interest. In another example, images of the point of interest taken from multiple locations may be used to determine the position of the point of interest.

5 Claims, 13 Drawing Sheets

(51) Int. Cl.
*G01C 11/02* (2006.01)
*G01C 21/00* (2006.01)

(56) References Cited

U.S. PATENT DOCUMENTS

| | | | |
|---|---|---|---|
| 5,528,518 A * | 6/1996 | Bradshaw et al. | 702/150 |
| 5,596,494 A * | 1/1997 | Kuo | 348/144 |
| 5,696,705 A | 12/1997 | Zykan | |
| 5,734,337 A | 3/1998 | Kupersmit | |
| 5,913,078 A | 6/1999 | Kimura et al. | |
| 6,083,353 A * | 7/2000 | Alexander, Jr. | 382/276 |
| 6,522,292 B1 * | 2/2003 | Ellenby et al. | 342/357.31 |
| 6,633,256 B2 | 10/2003 | Zhdanov et al. | |
| 6,735,522 B2 * | 5/2004 | Mori | 342/357.31 |
| 6,810,293 B1 | 10/2004 | Chou et al. | |
| 6,906,664 B2 * | 6/2005 | Tseng et al. | 342/357.36 |
| 6,947,820 B2 | 9/2005 | Ohtomo et al. | |
| 7,183,897 B2 | 2/2007 | Tang et al. | |
| 7,184,088 B1 * | 2/2007 | Ball | 382/154 |
| 7,471,249 B2 * | 12/2008 | Tang et al. | 343/702 |
| 7,646,339 B2 * | 1/2010 | Green et al. | 342/357.27 |
| 7,764,365 B2 * | 7/2010 | Nichols et al. | 356/139.01 |
| 7,792,330 B1 * | 9/2010 | Lowder et al. | 382/106 |
| 8,089,549 B2 * | 1/2012 | Yasuda et al. | 348/333.02 |
| 8,125,376 B1 | 2/2012 | Ashjaee et al. | |
| 2002/0054223 A1 | 5/2002 | Spriggs | |
| 2003/0090415 A1 | 5/2003 | Miyasaka et al. | |
| 2003/0128162 A1 | 7/2003 | Ellenby et al. | |
| 2003/0218675 A1 * | 11/2003 | Nonoyama | G01C 11/02 348/114 |
| 2004/0202292 A1 | 10/2004 | Cook | |
| 2004/0234123 A1 | 11/2004 | Shirai et al. | |
| 2004/0239558 A1 | 12/2004 | Geier et al. | |
| 2004/0257441 A1 | 12/2004 | Pevear et al. | |
| 2005/0001763 A1 | 1/2005 | Han et al. | |
| 2005/0094741 A1 | 5/2005 | Kuroda | |
| 2006/0100816 A1 | 5/2006 | Prentice et al. | |
| 2006/0114164 A1 * | 6/2006 | Iluz et al. | 343/757 |
| 2006/0221351 A1 | 10/2006 | Yu et al. | |
| 2006/0256007 A1 * | 11/2006 | Rosenberg | 342/450 |
| 2006/0259574 A1 * | 11/2006 | Rosenberg | 709/217 |
| 2006/0279727 A1 | 12/2006 | Nichols et al. | |
| 2007/0018890 A1 | 1/2007 | Kulyukin | |
| 2007/0046448 A1 * | 3/2007 | Smitherman | G01C 11/02 342/357.52 |
| 2007/0206175 A1 | 9/2007 | Rai et al. | |
| 2007/0229797 A1 | 10/2007 | Sugimoto | |
| 2007/0288197 A1 | 12/2007 | Martin | |
| 2008/0101656 A1 * | 5/2008 | Barnes et al. | 382/104 |
| 2008/0158044 A1 * | 7/2008 | Talbot et al. | 342/54 |
| 2008/0208454 A1 | 8/2008 | Pesterev et al. | |
| 2009/0030612 A1 | 1/2009 | Hayashi et al. | |
| 2009/0082139 A1 | 3/2009 | Hart | |
| 2009/0098880 A1 | 4/2009 | Lindquist | |
| 2009/0189804 A1 | 7/2009 | Ashjaee et al. | |
| 2009/0222237 A1 | 9/2009 | Otani et al. | |
| 2009/0225166 A1 | 9/2009 | Dronge | |
| 2010/0008515 A1 * | 1/2010 | Fulton et al. | 381/92 |
| 2010/0008543 A1 | 1/2010 | Yamada | |
| 2010/0033371 A1 | 2/2010 | Kumagai et al. | |
| 2010/0070162 A1 | 3/2010 | Aihara | |
| 2011/0066375 A1 * | 3/2011 | France et al. | 701/213 |
| 2012/0132814 A1 * | 5/2012 | Weinberg | G01V 5/0075 250/362 |
| 2012/0166137 A1 | 6/2012 | Grässer et al. | |
| 2012/0188122 A1 | 7/2012 | Ashjaee et al. | |
| 2012/0299936 A1 | 11/2012 | Ashjaee et al. | |
| 2012/0320193 A1 | 12/2012 | Lienhart et al. | |
| 2013/0080051 A1 | 3/2013 | Gribkov et al. | |
| 2014/0081570 A1 | 3/2014 | Ashjaee et al. | |

FOREIGN PATENT DOCUMENTS

| | | |
|---|---|---|
| EP | 2312330 A1 | 4/2011 |
| JP | 8-129216 A | 5/1996 |
| JP | 8-240428 A | 9/1996 |
| JP | 2001-503134 A | 3/2001 |
| JP | 2003-214850 A | 7/2003 |
| JP | 2007-218896 A | 8/2007 |
| JP | 2008-516250 A | 5/2008 |
| JP | 2009-94987 A | 4/2009 |
| JP | 2009-210334 A | 9/2009 |
| JP | 2010-38822 A | 2/2010 |
| WO | 98/10246 A1 | 3/1998 |
| WO | 2006/070047 A1 | 7/2006 |
| WO | 2011/041547 A1 | 11/2011 |

OTHER PUBLICATIONS

Office Action received for European Patent Application No. 11179395.6, mailed on Jan. 7, 2013, 4 pages.
Office Action received for European Patent Application No. 10183800.1, mailed on Dec. 30, 2011, 3 pages.
Office Action received for European Patent Application No. 10183800.1, mailed on Jul. 5, 2012, 4 pages.
Extended European Search Report and Search Opinion received for European Patent Application No. 11179395.6, mailed on Dec. 1, 2011, 8 pages.
Extended European Search Report received for European Patent Application No. 11189979.5, mailed on Feb. 27, 2012, 4 pages.
Notice of Allowance received for U.S. Appl. No. 12/871,705, mailed on Oct. 20, 2011, 13 pages.
Non Final Office Action received for U.S. Appl. No. 13/353,220, mailed only Oct. 17, 2012, 10 pages.
Final Office Action received for U.S. Appl. No. 13/353,220, mailed on Apr. 11, 2013, 9 pages.
Non Final Office Action received for U.S. Appl. No. 13/353,220, mailed on Sep. 6, 2013, 11 pages.
Extended European Search Report and Search Opinion received for European Patent Application No. 12186129.8, mailed on Feb. 6, 2013, 6 pages.
Office Action received for Japanese Patent Application No. 2010-220064, mailed on Feb. 27, 2014, 10 pages (6 page of English Translation and 4 pages of Official Copy).
Notice of Allowance received for U.S. Appl. No. 13/353,220, mailed on Dec. 13, 2013, 8 pages.
Non-Final Office Action received for U.S. Appl. No. 13/301,669, mailed on Dec. 16, 2013, 43 pages.
Non-Final Office Action received for U.S. Appl. No. 14/088,194, mailed on Mar. 5, 2014, 38 pages.
Non Final Office Action received for U.S. Appl. No. 13/626,688, mailed on Aug. 6, 2014, 11 pages.
Notice of Allowance received for Japanese Patent Application No. 2010-220064, mailed on Jan. 22, 2015, 3 pages of Official Copy only (See Communication under 37 CFR § 1.98(a) (3)).
Office Action Received for Japanese Patent Application No. 2010-220064, mailed on Sep. 5, 2014, 4 pages (2 pages of English Translation and 2 pages of Official Copy).
Final Office Action received for U.S. Appl. No. 13/301,669, mailed on Oct. 8, 2014, 45 pages.
Final Office Action received for U.S. Appl. No. 14/088,194, mailed on Sep. 23, 2014, 45 pages.

* cited by examiner

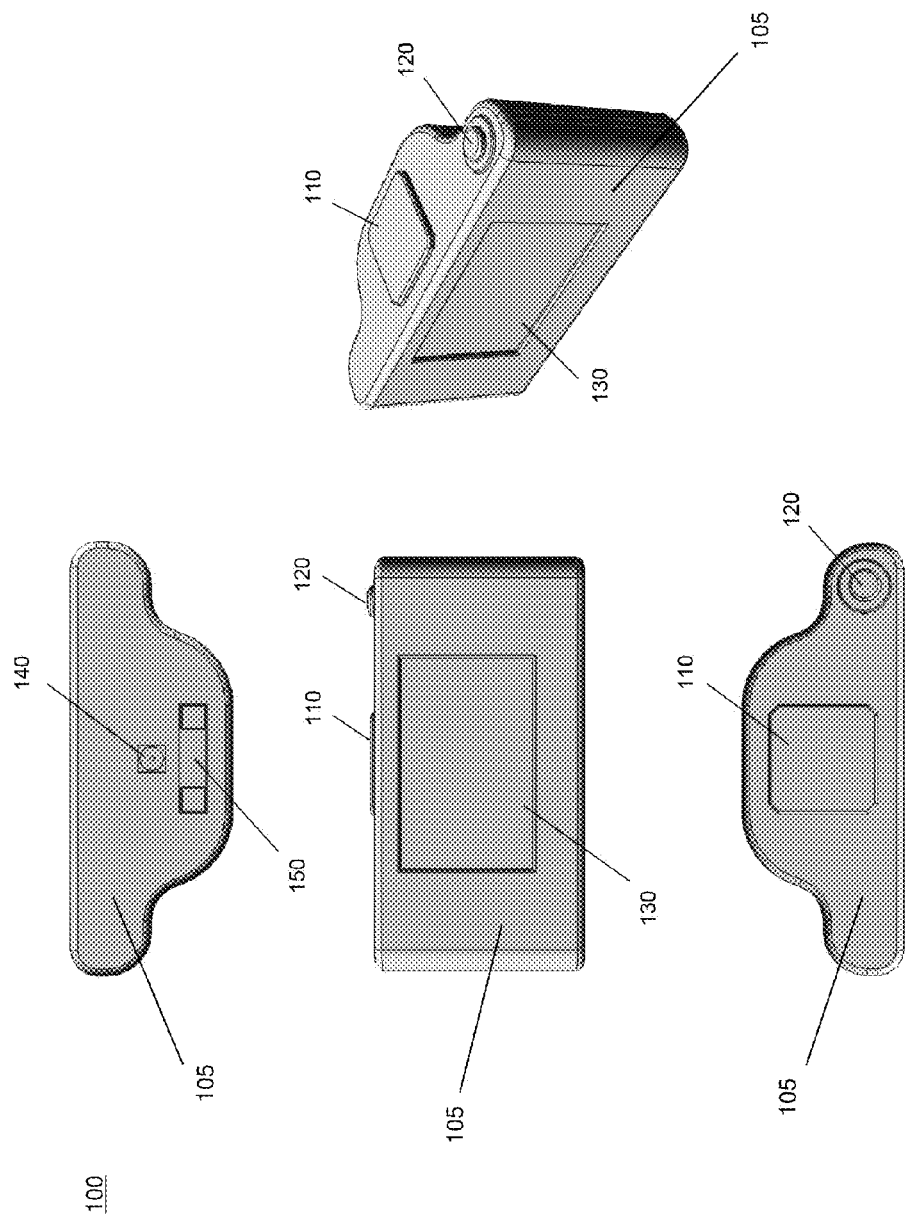

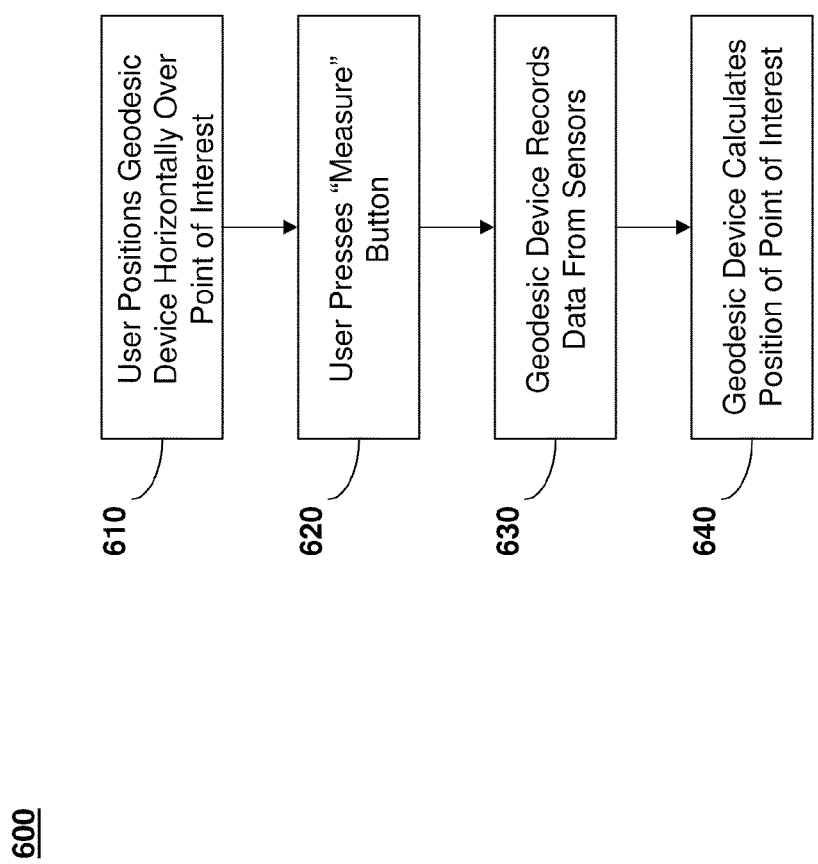

GRAPHICS-AIDED REMOTE POSITION MEASUREMENT WITH HANDHELD GEODESIC DEVICE

1. FIELD

The present disclosure relates generally to geodesy and precise positioning of a handheld geodesic device.

2. RELATED ART

Geodesists commonly use satellite positioning devices, such as Global Navigation Satellite System (GNSS) devices, to determine the location of a point of interest anywhere on, or in the vicinity of, the Earth. Often, these points of interest are located at remote destinations which are difficult to access. Thus, compact, easy to carry positioning devices are desired.

Typically, to properly measure the position of a given point using a GNSS-based device, the GNSS antenna must be positioned directly above the point of interest with the antenna ground plane parallel to the ground. To position a GNSS device in such a manner, external hardware is commonly used. For example, a tripod may be used to properly position the GNSS antenna directly over the point of interest. In another example, a pole may be used to hang a GNSS antenna above the point of interest, allowing the antenna to swing until settling into a position where the antenna ground plane is parallel to the ground. While both external hardware devices allow the user to "level" the antenna, such devices are bulky and difficult to carry. Thus, even as positioning devices become more compact, they all suffer from the drawback of requiring additional bulky positioning equipment.

Recently, GNSS-based devices have become increasingly complex as additional measurement technologies have been incorporated. (See, e.g., U.S. Pat. No. 6,947,820B2, "Construction machine control system" and U.S. Pat. No. 5,471,218, "Integrated terrestrial survey and satellite positioning system.") For example, in addition to an antenna and a receiver, many GNSS devices may include distance meters, electronic compasses, or video cameras. However, even as current GNSS-based devices include such sensors, none allow a user to position the device without the use of external hardware.

Therefore, a geodesic device capable of measuring position without the use of additional positioning equipment is desired.

BRIEF SUMMARY

Embodiments of the present disclosure are directed to a graphics-aided geodesic device. The device may include a display, camera, distance meter, GNSS (Global Navigation Satellite System, including GPS, GLONASS, and Galileo) receiver and antenna, and horizon sensors. Data from the camera and horizon sensors may be displayed to assist the user in positioning the device over a point of interest.

In one example, the distance meter may be used to determine the position of the point of interest by compensating for the vertical distance between the device and the point of interest.

In another example, images, orientation data, and position data taken from multiple locations may be used to determine the position of the point of interest.

BRIEF DESCRIPTION OF THE DRAWINGS

FIG. 1 illustrates an exemplary graphics-aided geodesic device viewed from various angles.

FIG. 6A illustrates an exemplary process for measuring position using a graphics-aided geodesic device.

DETAILED DESCRIPTION

Figure 2A:
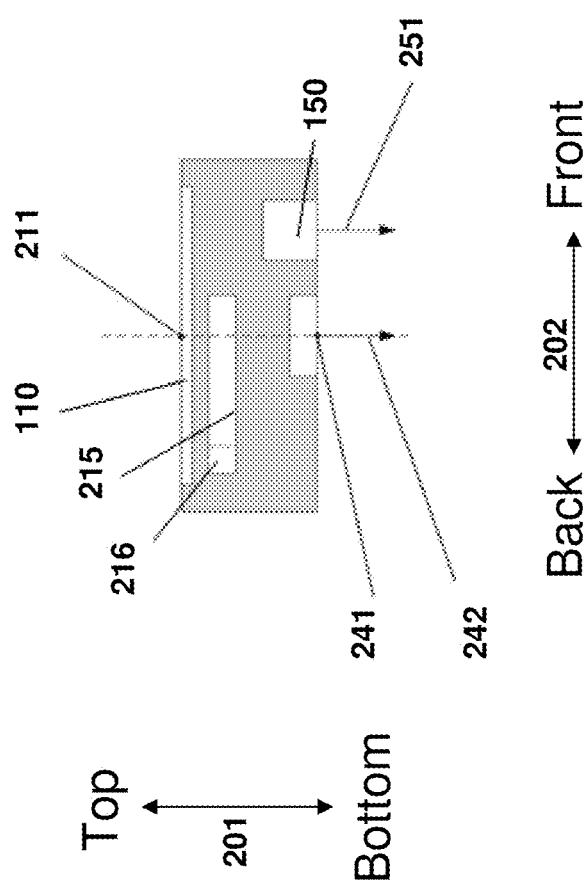
FIG. 2A illustrates an exemplary view of the orientation of the components of a graphics-aided geodesic device.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Various embodiments are described below relating to a handheld graphics-aided geodesic device. The device may include various sensors, such as a camera, distance sensor, and horizon sensors. A display element may also be included for assisting a user to position the device without the aid of external positioning equipment (e.g., a tripod or pole).

FIG. 1 illustrates an exemplary graphics-aided geodesic device 100 viewed from various angles. Graphics-aided geodesic device 100 is shown contained within camera housing 105. Camera housing 105 allows the user to hold graphics-aided geodesic device 100 as one would hold a typical camera. In one example, the device may include GNSS antenna 110 which may receive signals transmitted by a plurality of GNSS satellites and used by graphics-aided geodesic device 100 to determine position. In one example, GNSS antenna may receive signals transmitted by at least 4 GNSS satellites. In the example shown by FIG. 1, GNSS antenna 110 is located on the top side of graphics-aided geodesic device 100.

Graphics-aided geodesic device 100 may further include a GNSS receiver (not shown) for converting the signal received by GNSS antenna 110 into Earth-based coordinates, for example, World Geodetic System 84 (WGS84), Earth-Centered Earth Fixed (ECEF), local east, north, up coordinates (ENU), and the like. Such receivers are well-known by those of ordinary skill in the art and any such device may be used.

Graphics-aided geodesic device 100 may further include "measure" button 120 to cause the device to perform a position measurement. In one example, this button may be similar to that of a conventional camera. However, instead of taking a photograph, "measure" button 120 may cause graphics-aided geodesic device 100 to perform a position measurement as described in greater detail below. In the example shown by FIG. 1, "measure" button 120 is located on the top side of graphics-aided geodesic device 100.

Graphics-aided geodesic device 100 may further include display 130 for displaying information to assist the user in positioning the device. Display 130 may be any electronic display such as a projection display, a liquid crystal (LCD) display, light emitting diode (LED) display, a plasma display, and the like. Such display devices are well-known by those of ordinary skill in the art and any such device may be used. In the example shown by FIG. 1, display 130 is located on the back side of graphics-aided geodesic device 100.

Graphics-aided geodesic device 100 may further include camera 140 for recording still images or video. Such recording devices are well-known by those of ordinary skill in the art and any such device may be used. In the example illustrated by FIG. 1, camera 140 is located on the bottom side of graphics-aided geodesic device 100. A more detailed description of the positioning of camera 140 will be provided below with respect to FIGS. 2A-C. In one example, display 130 may be used to display the out put of camera 140. Thus, when held upright, display 130 displays a view of the ground located below graphics-aided geodesic device 100.

Graphics-aided geodesic device 100 may further include horizon sensors (not shown) for determining the orientation of the device. The horizon sensors may be any type of horizon sensor, such as an inclinometer, accelerometer, and the like. Such horizon sensors are well-known by those of ordinary skill in the art and any such device may be used. In one example, a representation of the output of the horizon sensors may be displayed using display 130. A more detailed description of display 130 is provided below.

Graphics-aided geodesic device 100 may further include distance sensor 150 to measure a linear distance. Distance sensor 150 may use any range-finding technology, such as sonar, laser, radar, and the like. Such distance sensors are well-known by those of ordinary skill in the art and any such device may be used. In the example illustrated by FIG. 1, distance sensor 150 is located on the bottom side of graphics-aided geodesic device 100.

Figure 2B:
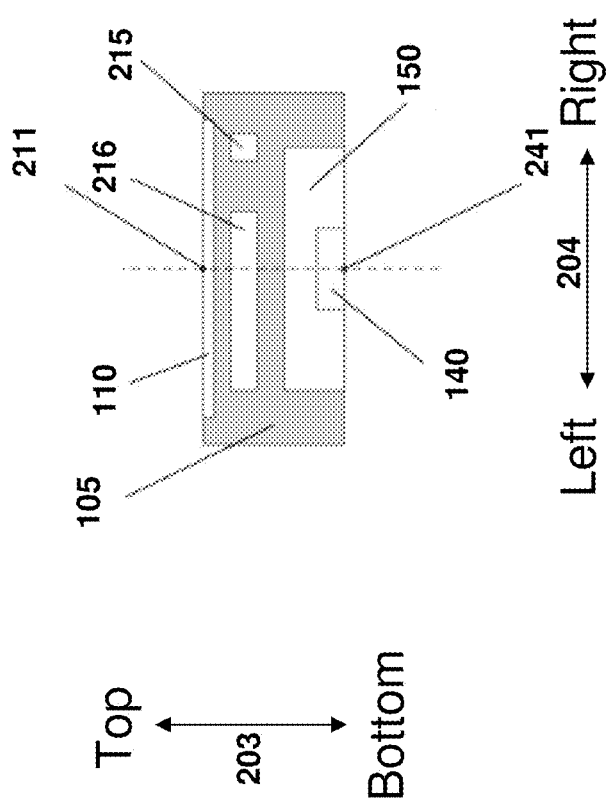
FIG. 2B illustrates another exemplary view of the orientation of the components of a graphics-aided geodesic device.
Figure 2C:
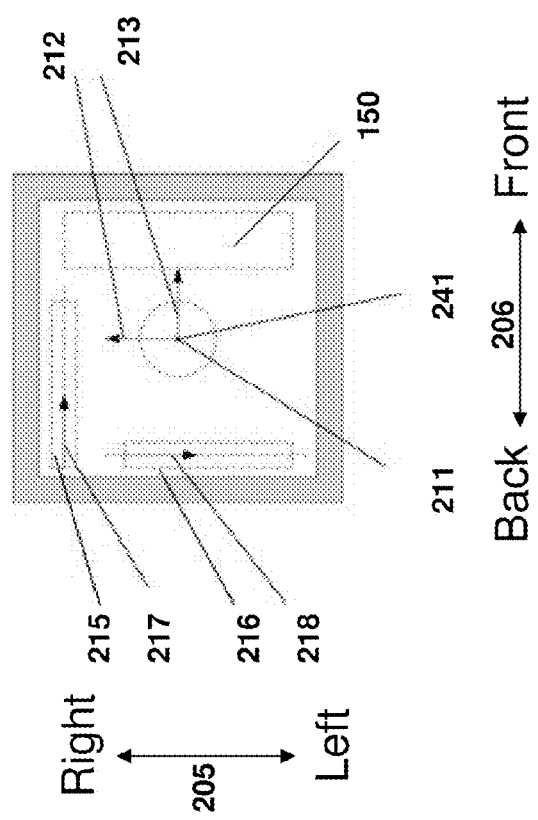
FIG. 2C illustrates yet another exemplary view of the orientation of the components of a graphics-aided geodesic device.

FIGS. 2A-C illustrate exemplary views of graphics-aided geodesic device 100 and the orientation of its components from various angles. FIG. 2A shows a side view of graphics-aided geodesic device 100 with arrows 201 and 202 indicating the top/bottom and front/back of the device, respectively. FIG. 2B shows graphics-aided geodesic device 100 viewed from the back with arrows 203 and 204 indicating the top/bottom and left/right side of the device, respectively. FIG. 2C shows a bottom view of graphics-aided geodesic device 100 with arrows 205 and 206 indicating the right/left side and front/back of the device, respectively.

In the examples illustrated by FIGS. 2A-C, camera housing 105 contains antenna 110, horizon sensors 215 and 216, distance sensor 150, and camera 140. The orientation of the components will be described herein with the use of vectors which indicate a direction in space. For instance, antenna 110 has an antenna ground plane defined by antenna phase center 211 and two ground plane vectors 212 and 213. In one example, ground plane vectors 212 and 213 are parallel or substantially parallel to the local horizon. Camera 140 has optical center 241 located along camera optical axis 242. Camera optical axis 242 passes through antenna phase center 211 and is orthogonal or substantially orthogonal to ground plane vectors 212 and 213. Distance sensor 150 has distance sensor main axis (measuring direction) 251 which is parallel or substantially parallel to camera optical axis 242. Horizon sensors 215 and 216 have orthogonal or substantially orthogonal measurement vectors 217 and 218 which create a plane parallel or substantially parallel to the antenna ground plane defined by ground plane vectors 212 and 213. It should be appreciated that in a real-world application, the components of graphics-aided geodesic device 100 may not be positioned exactly as described above. For instance, due to manufacturing imperfections, the orientations of certain components may not be parallel or orthogonal to the other components as designed. The tolerances for the orientations of the various components depend on the desired precision of the resulting position measurement.

Figure 3:
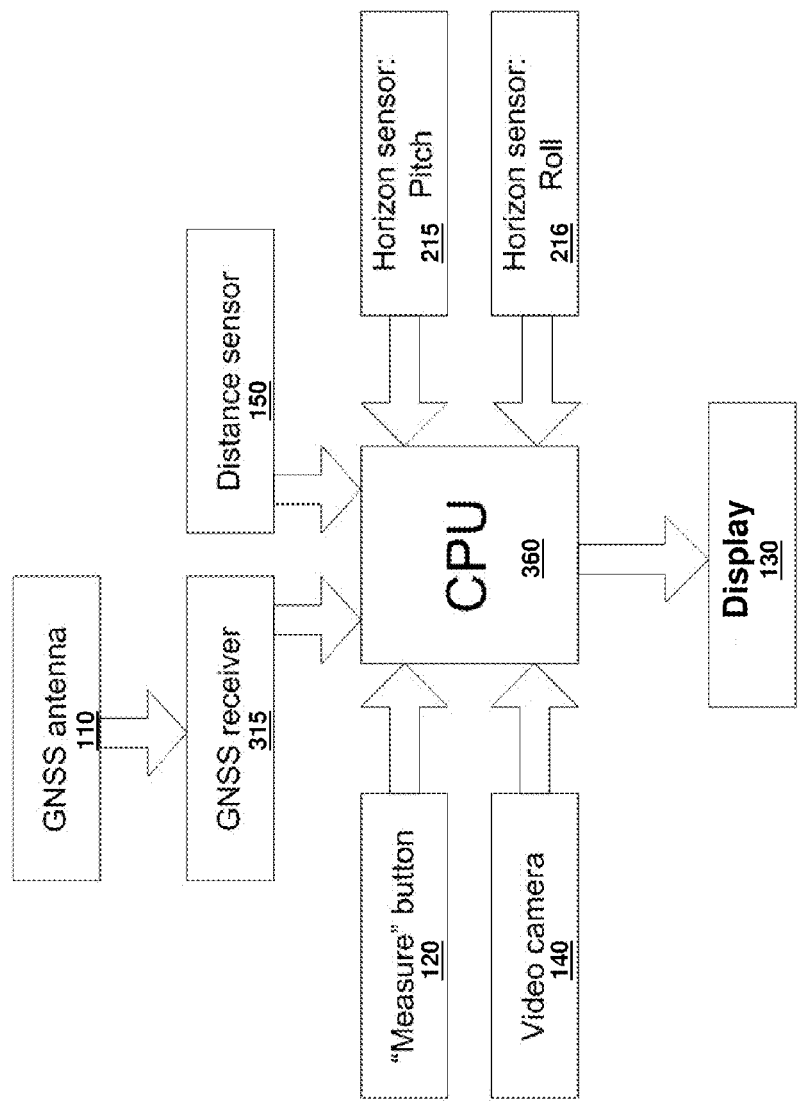
FIG. 3 illustrates an exemplary logic diagram showing the relationships between the various components of a graphics-aided geodesic device.

FIG. 3 illustrates an exemplary logic diagram showing the relationships between the various components of graphics-aided geodesic device 100. In one example, GNSS antenna 110 may send position data received from GNSS satellites to GNSS receiver 315. GNSS receiver 315 may convert the received GNSS satellite signals into Earth-based coordinates, such as WGS84, ECEF, ENU, and the like. GNSS receiver 315 may further send the coordinates to CPU 360 for processing along with distance data from distance sensor 150, pitch data from pitch horizon sensor 215, roll data from roll horizon sensor 216, a measure command from "measure" button 120, and image data from video camera 140. CPU 360 processes the data as will be described in greater detail below and provides display data to be displayed on display 130.

Figure 4:
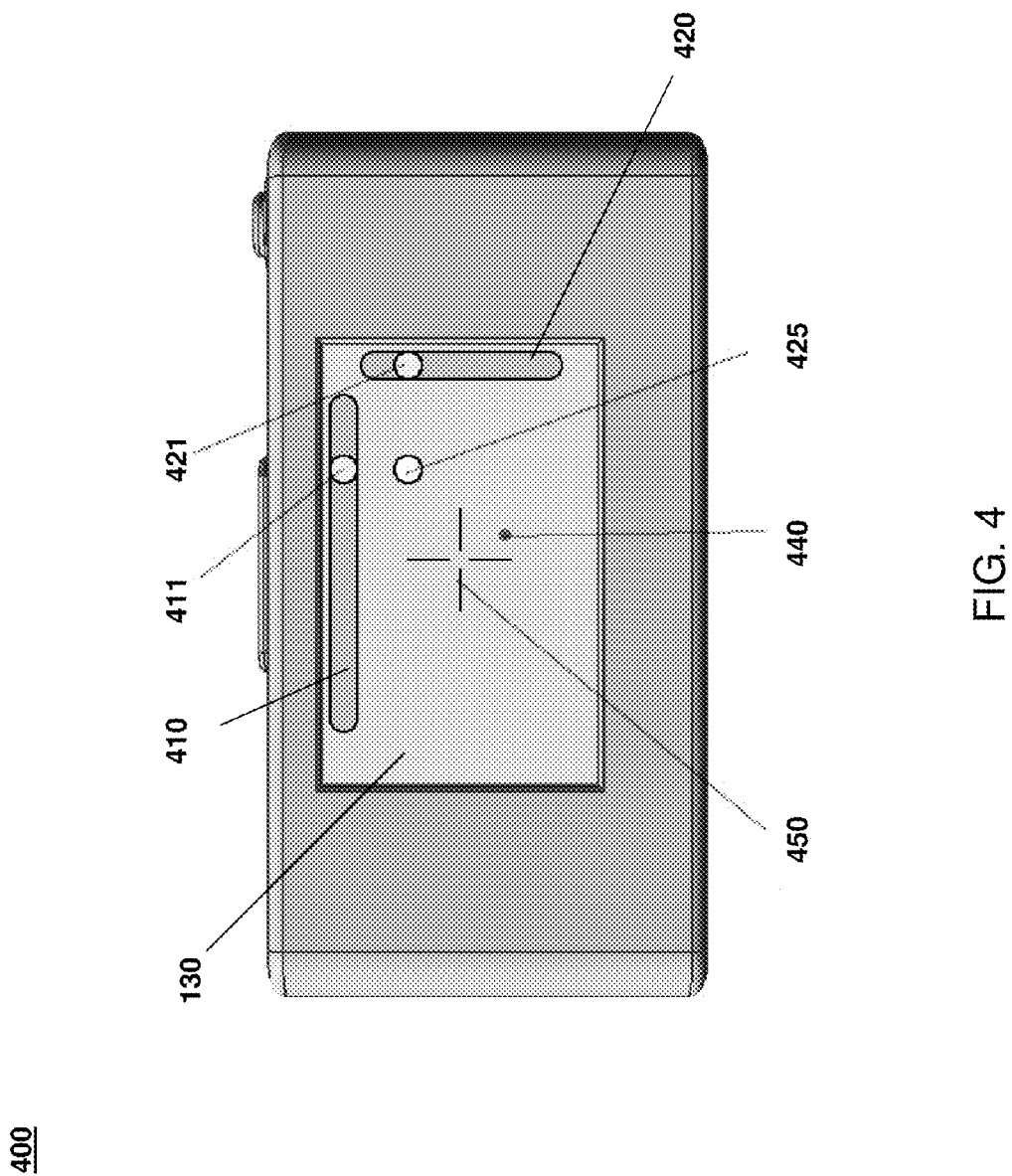
FIG. 4 illustrates an exemplary view of the display screen of a graphics-aided geodesic device including elements used for positioning the device.

FIG. 4 illustrates an exemplary view 400 of display 130 for positioning graphics-aided geodesic device 100. In one example, display 130 may display the output of camera 140. In this example, the display of the output of camera 140 includes point of interest marker 440. As shown in FIG. 4, point of interest marker 440 is a small circular object identifying a particular location on the ground. In the examples provided herein, we assume that the location to be measured is located on the ground and that the point of interest is identifiable by a visible marker (e.g., point of interest marker 440). The marker may be any object having a small height value. For instance, an "X" painted on ground or a circular piece of colored paper placed on the point of interest may serve as point of interest marker 440.

In another example, display 130 may further include virtual linear bubble levels 410 and 420 corresponding to the roll and pitch of graphics-aided geodesic device 100, respectively. Virtual linear bubble levels 410 and 420 may include virtual bubbles 411 and 421 which identify the amount and direction of roll and pitch of graphics-aided geodesic device 100. Virtual linear bubble levels 410 and 420 and virtual bubbles 411 and 421 may be generated by CPU 360 and overlaid on the actual image output of camera 140. In one example, positioning of virtual bubbles 411 and 421 in the middle of virtual linear bubble levels 410 and 420 indicate that the device is positioned "horizontally." As used herein, "horizontally" refers to the orientation whereby the antenna ground plane is parallel to the local horizon.

In one example, data from horizon sensors 215 and 216 may be used to generate the linear bubble levels 410 and 420. For instance, sensor data from horizon sensors 215 and 216 may be sent to CPU 360 which may convert a scaled sensor measurement into a bubble coordinate within virtual linear bubble levels 410 and 420. CPU 360 may then cause the display on display 130 of virtual bubbles 411 and 421 appropriately placed within virtual linear bubble levels 410 and 420. Thus, virtual linear bubble levels 410 and 420 may act like traditional bubble levels, with virtual bubbles 411 and 421 moving in response to tilting and rolling of graphics-aided geodesic device 400. For example, if graphics-aided geodesic device 100 is tilted forward, bubble 420 may move downwards within virtual linear bubble level 420. Additionally, if graphics-aided geodesic device 100 is rolled to the left, virtual bubble 411 may move to the right within virtual linear bubble level 410. However, since virtual linear bubble levels 410 and 420 are generated by CPU 360, movement of virtual bubbles 411 and 421 may be programmed to move in any direction in response to movement of graphics-aided geodesic device 100.

In another example, display 130 may further include planar bubble level 425. Planar bubble level 425 represents a combination of virtual linear bubble levels 410 and 420 (e.g., placed at the intersection of the bubbles within the linear levels) and may be generated by combining measurements of two orthogonal horizon sensors (e.g., horizon sensors 215 and 216). For instance, scaled measurements of horizon sensors 215 and 216 may be converted by CPU 360 into X and Y coordinates on display 130. In one example, measurements from horizon sensor 215 may be used to generate the X coordinate and measurements from horizon sensor 216 may be used to generate the Y coordinate of planar bubble level 425.

As shown in FIG. 4, display 130 may further include central crosshair 450. In one example, central crosshair 450 may be placed in the center of display 130. In another example, the location of central crosshair 450 may represent the point in display 130 corresponding to the view of camera 140 along optical axis 242. In yet another example, placement of planar bubble level 425 within central crosshair 450 may correspond to graphics-aided geodesic device 100 being positioned horizontally. Central crosshair 450 may be drawn on the screen of display 130 or may be electronically displayed to display 130.

Display 130 may be used to aid the user in positioning graphics-aided geodesic device 100 over a point of interest by providing feedback regarding the placement and orientation of the device. For instance, the camera output portion of display 130 provides information to the user regarding the placement of graphics-aided geodesic device 100 with respect to objects on the ground. Additionally, virtual linear bubble levels 410 and 420 provide information to the user regarding the orientation of graphics-aided geodesic device 100 with respect to the horizon. Using at least one of the two types of output displayed on display 130, the user may properly position graphics-aided geodesic device 100 without the use of external positioning equipment.

In the example illustrated by FIG. 4, both point of interest marker 440 and planar bubble level 425 are shown as off-center from central crosshair 450. This indicates that optical axis 242 of camera 140 is not pointed directly at the point of interest and that the device is not positioned horizontally. If the user wishes to position the device horizontally above a particular point on the ground, the user must center both planar bubble level 425 and point of interest marker 440 within central crosshair 450 as shown in FIG. 5.

Figure 5:
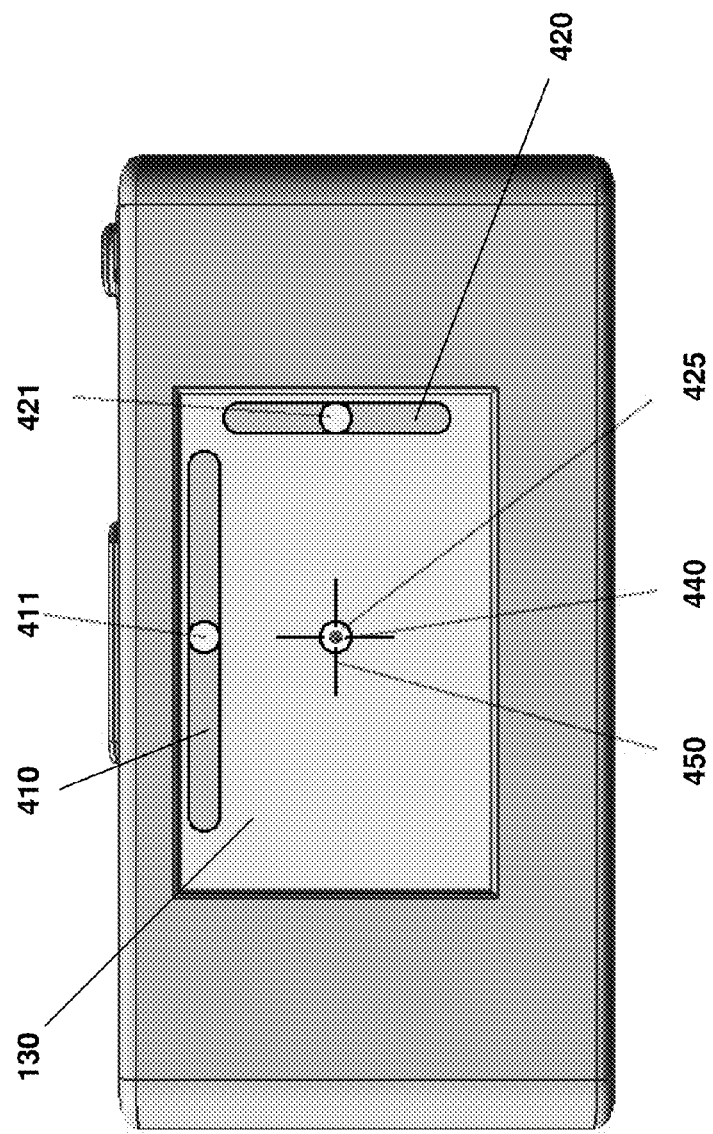
FIG. 5 illustrates another exemplary view of the display screen of a graphics-aided geodesic device oriented horizontally and above a point of interest.

FIG. 5 illustrates another exemplary view 500 of display 130. In this example, virtual linear bubble levels 410 and 420 are shown with their respective bubbles centered, indicating that the device is horizontal. As such, planar bubble level 425 is also centered within central crosshair 450. Additionally, in this example, point of interest marker 440 is shown as centered within central crosshair 450. This indicates that optical axis 242 of camera 140 is pointing towards point of interest marker 440. Thus, in the example shown by FIG. 5, graphics-aided geodesic device 100 is positioned horizontally above point of interest marker 440.

As discussed above with respect to FIG. 2, antenna phase center 211 may be located along optical axis 242. This means that in the example shown by FIG. 5, antenna phase center 211 is also located directly above point of interest marker 440. Thus, the only difference between the position of antenna phase center 211 and point of interest marker 440 is a vertical component equal to the vertical distance between point of interest marker 440 and antenna phase center 211. In this example, the position of point of interest marker 440 may be calculated using the following equation:

$$\vec{P}_x = \vec{P}_{dev} - \vec{n}(D_{in} + D_{out}) \quad (1)$$

Where:

$\vec{P}_x$—Calculated position of the point of interest.

$\vec{P}_{dev}$—Measured GNSS position of the device antenna phase center.

$\vec{n}$—Unit vector orthogonal to the ground.

$D_{in}$—Vertical distance between antenna phase center 211 and the zero measurement point of distance sensor 150.

$D_{out}$—Distance measured by distance sensor 150 from the sensor's zero measurement point to an object along distance sensor main axis 251.

As shown above, $\vec{P}_x$ of equation (1) represents the calculated position of the point of interest. $\vec{P}_{dev}$ represents the position of antenna phase center 211 determined by graphics-aided geodesic device 100. $\vec{n}$ represents a unit vector pointing in a direction orthogonal to the ground. $D_{in}$ represents the vertical distance between antenna phase center 211 and the zero measurement point of distance sensor 150. The zero measurement point of distance sensor 150 is the point in space for which distance sensor 150 is configured to return a zero value and may be located either inside or outside of graphics-aided geodesic device 100. Thus, $D_{in}$ is a constant value that is specific to each graphics-aided geodesic device 100. Finally, $D_{out}$ represents the distance measured by distance sensor 150 from the sensor's zero measurement point to an object along distance sensor main axis 251. Therefore, $\vec{P}_x$ is calculated by taking the position measured by graphics-aided geodesic device 100 and subtracting a vertical distance equal to the distance measured by distance sensor 150 plus the distance between antenna phase center 211 and the zero measurement point of distance sensor 150.

It should be appreciated that the coordinates used in equation (1) may be expressed in any coordinate system. For example, the above described equation may be applicable to any Cartesian coordinate system and the measurement results may be converted to any Earth-based coordinates, such as WGS84, ECEF, ENU, and the like. Such conversion methods are well-known by those of ordinary skill in the art.

FIG. 6A illustrates exemplary process 600 for measuring a position using graphics-aided geodesic device 100. At block 610 the user positions graphics-aided geodesic device 100 horizontally above the point of interest as described with respect to FIG. 5. At block 620, the user presses "measure" button 120 while graphics-aided geodesic device 100 is positioned horizontally above the point of interest. At block 630, graphics-aided geodesic device 100 records the position data from receiver 315 and the distance measured by distance sensor 150. At block 640, CPU 360 of graphics-aided geodesic device 100 calculates the position of the point of interest using equation (1) and the values recorded at block 630.

Figure 6B:
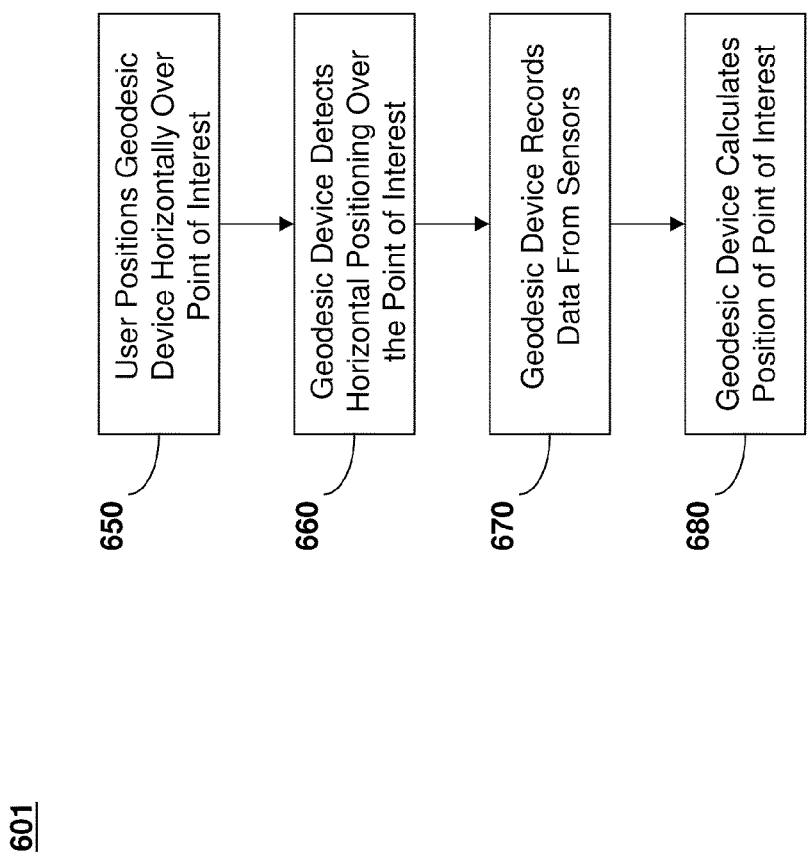
FIG. 6B illustrates another exemplary process for measuring position using a graphics-aided geodesic device.

FIG. 6B illustrates another exemplary process 601 similar to exemplary process 600 for measuring a position using graphics-aided geodesic device 100. The main difference between exemplary processes 600 and 601 is that in exemplary process 601, the user is not required to press "measure" button 120. The process begins at block 650, which is similar to block 610. At block 660, graphics-aided geodesic device 100 detects that the device is positioned horizontally above the point of interest. In one example, this may be accomplished by detecting that both planar bubble 425 and point of interest marker 440 are centered within central crosshair 450.

In one particular example, graphics-aided geodesic device 100 may determine that planar bubble 425 is centered on central crosshair 450 by comparing the horizon sensor data which has been converted into X-Y coordinates with the display coordinates located at central crosshair 450. Additionally, graphics-aided geodesic device 100 may determine that point of interest marker 440 is centered on central crosshair 450 by utilizing an image recognition program for identifying point of interest marker 440 and determining its location within display 130. This may require that point of interest marker 440 conform to some predefined standard. For instance, point of interest marker 440 may be required to be a particular color or shape in order to be identified by the image recognition program of graphics-aided geodesic device 100. Such recognition algorithms are well-known by those of ordinary skill in the art and any such algorithm may be used in graphics-aided geodesic device 100.

Thus, in one example, when graphics-aided geodesic device 100 determines that planar bubble 425 and point of interest marker 440 are centered within central crosshair 450, the device may proceed to block 670. In another example, block 660 may only require that the distance between central crosshair 450 and planar bubble 425 and the distance between central crosshair 450 and point of interest marker 440 fall below a predefined distance threshold before proceeding to block 670. Blocks 670 and 680 are similar to blocks 630 and 640 of FIG. 6A.

Calculation of the Intersection Point of Multiple Cones

The examples provided in FIGS. 6A and 6B require that the device be positioned at least substantially horizontal and substantially above the point of interest. Since the user is not expected to perfectly orient the device, graphics-aided geodesic device 100 may allow a deviation in the angle and position. For instance, in one example, a deviation of 2 degrees from horizontal and 4 mm from the point of interest may be acceptable. However, it should be appreciated that other tolerances may be used depending on the desired application. The variations described below allow graphics-aided geodesic device 100 to perform position measurements without having to be positioned as required in the examples provided in FIGS. 6A and 6B. The following variations are based on two supplementary techniques: calculation of the camera pointing vector deviation and calculation of the intersection point of multiple cones.

Figure 7:
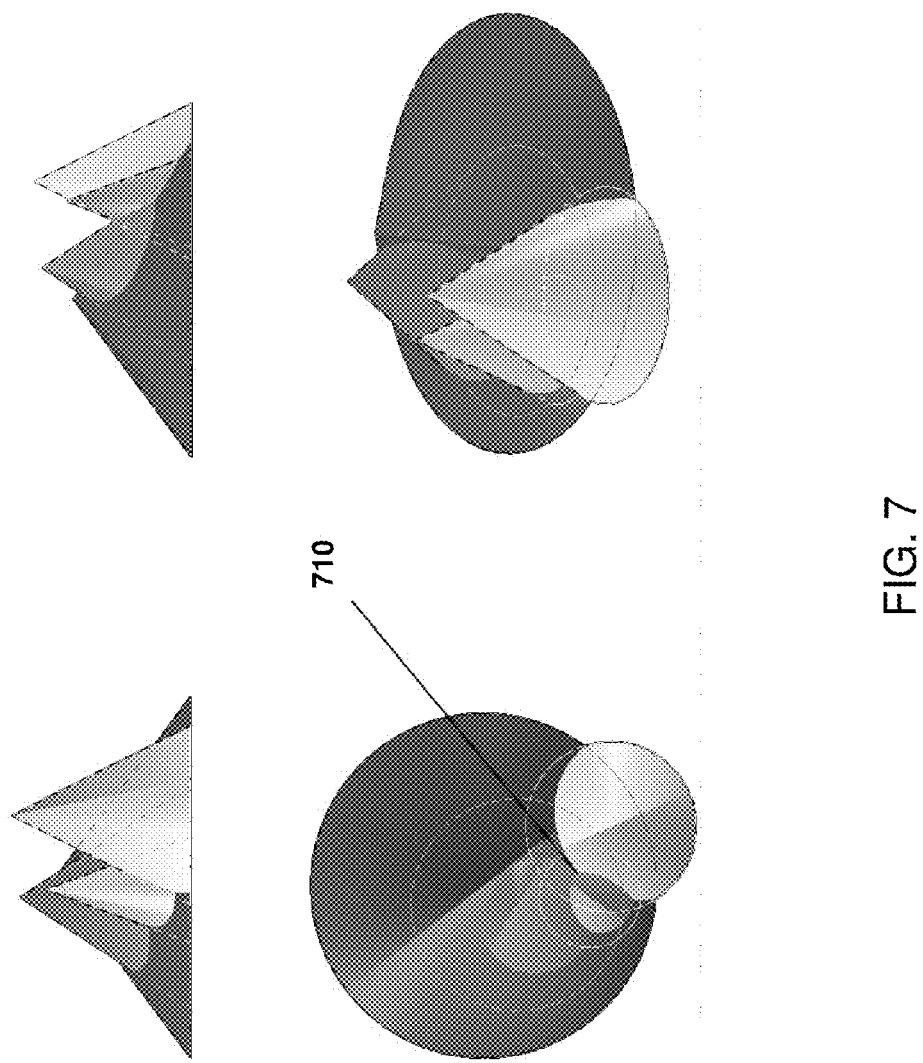
FIG. 7 illustrates the intersection of four cones and the common point of intersection between them.

The latter technique is based on the principal that the intersection region of two cone surfaces is an ellipse, the intersection region of three cones is a pair of points, and the intersection region of four cones is a single point. Thus, if graphics-aided geodesic device 100 generates four different cones, each cone containing point of interest marker 440 somewhere on its surface, the position of point of interest marker 440 may be determined FIG. 7 illustrates the intersection of four cones and the point 710 shared among them. The process of generating each cone will be described in greater detail below. It should be appreciated that four cones is the minimum number of cones needed to identify a common point. Additional cones may be used to increase the precision of the intersection point technique.

Calculation of the Camera Pointing Vector Deviation

To generate the cones described above, the following parameters may be determined: the position of the cone apex, the orientation of the cone axis, and the angle between the cone axis and the cone surface. Using these parameters to generate a mathematical representation of a cone is well-known and understood by those of ordinary skill in the art. For example, the mathematical representation of the cone may be generated using the methods described in Appendix C. In one example, determining the angle between the cone axis and the cone surface may be accomplished by calculating the camera pointing vector deviation.

Calculating the camera pointing vector deviation is based on the principle that each pixel of the image taken by camera 140 and displayed on display 130 represents an angle from the camera optical axis 242. For example, the pixel at the center of display 130 may represent optical axis 242, while a pixel 5 pixels to the right of center may represent a particular angle to the right of optical axis 242. By knowing the pixel coordinates of an object on the image of camera 140, the direction to this object from camera optical axis 242 may be calculated using equation (2) below. For use with graphics-aided geodesic device 100, it is sufficient to know the angle between the pointing vector and camera optical axis 242, where the pointing vector represents the vector from camera optical center 241 to the point of interest. For a perfect central projection camera, this angle value may be approximated as a linear function of the pixel distance from the center of the display and may be modeled using the following equation:

$$\alpha_{pnt} = kd \qquad (2)$$

Where:

$\alpha_{pnt}$—The angle between the pointing vector and camera optical axis 242.

k—Calibration coefficient, determined by the camera effective focal length.

d—Pixel distance between the center of the frame and the point of interest.

As shown above, $\alpha_{pnt}$ of equation (2) represents the angle between the pointing vector and optical axis 242. k represents a calibration coefficient which is determined by the camera effective focal length. This value is a constant value specific to each camera model. d represents the pixel distance, in pixels, between the center of display 130 (central crosshair 450) and point of interest marker 440. Thus, the angle between the pointing vector and optical axis 242 is equal to the product of the camera calibration coefficient and the number of pixels between central crosshair 450 and point of interest marker 440.

Equation (2) only applies to perfect central projection cameras. However, real cameras require that barrel distortion be taken into account. In most practical cases, it would be sufficient to consider distortion as a projection of a spherical surface to a tangent plane. Thus, a corrected pixel distance must be calculated and used in place of d in equation (2). The following equation may be used to find the corrected pixel distance:

$$d_{corr} = d \frac{r}{\sqrt{r^2 - d^2}} \qquad (3)$$

Where:

$d_{corr}$—Corrected pixel distance between the center of the screen and the point of interest. This value replaces d in equation (2).

d—Pixel distance between the center of the frame and the point of interest (same as in equation (2)).

r—Calibration parameter representing the projected sphere radius in relative pixels units.

As shown above, $d_{corr}$ of equation (3) represents the corrected pixel distance between the center of the screen and the point of interest taking into consideration the barrel distortion of the camera. d represents the pixel distance, in pixels, between the center of the frame (central crosshair 450) and point of interest marker 440. r represents the calibration parameter representing the projected sphere radius in relative pixels units. This value takes into consideration all internal lens distortions and is a constant value specific to each camera. Thus, to take into consideration the barrel distortion, the corrected pixel distance ($d_{corr}$) calculated in equation (3) should be used in place of d in equation (2).

Using equations (2) and (3), the angle between the cone axis and the cone surface may be calculated. As discussed above, the angle between the cone axis and the cone surface is one of the parameters used to generate a cone. Specifically, if given the position of the apex of the cone, the orientation of the cone axis, and the angle between the cone axis and the cone surface, one of ordinary skill in the art would understand how to generate an equation representing the cone. Processes for determining the other recited parameters are described in greater detail below.

Figure 8A:
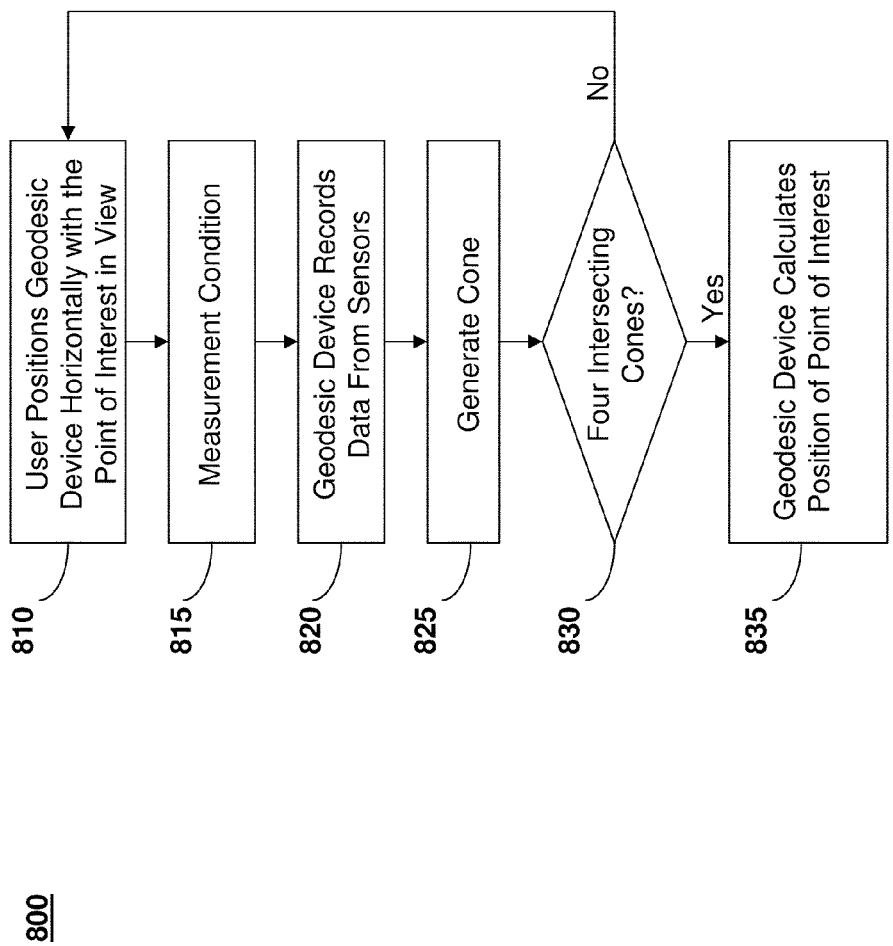
FIG. 8A illustrates an exemplary process for measuring a position using a graphics-aided geodesic device.

FIG. 8A illustrates an exemplary process 800 for measuring a position using graphics-aided geodesic device 100 and the intersection point of multiple cones technique. At block 810, the process begins with the user positioning graphics-aided geodesic device 100 horizontally with point of interest marker 440 in the field of view of display 130. At block 815, graphics-aided geodesic device 100 detects a measurement condition. In one example, the measurement condition may be receiving a "measure" command in response to the user pressing "measure" button 120. This is similar to block 620 of FIG. 6A. In another example, the measurement condition may be that the distance between central crosshair 450 and planar bubble 425 falls below a predefined distance threshold. This is similar to block 660 of FIG. 6B. Upon detection of a measurement condition, the process moves to block 820. At block 820, graphics-aided geodesic device 100 records data from the sensors. For example, position data may be recorded from GNSS receiver 315, pitch and roll data may be recorded from horizon sensors 215 and 216, and image data may be recorded from video camera 140. At block 825, CPU 360 uses the position data, pitch and roll data, and image data to generate a cone. Since the device has been positioned horizontally or at least substantially horizontal, the apex of the cone is the position of camera optical center 241, the cone axis is optical axis 242 which is orthogonal to the ground, and the angle between the cone axis and the cone surface is the angle between the pointing vector to point of interest marker 440 and optical axis 242 calculated using equations (2) and (3). At block 830, CPU 360 determines whether four intersecting cones have been generated. If there are less than four intersecting cones, the process returns to block 810. However, if there are at least four intersecting cones, the process moves to block 835. At block 835, CPU 360 of graphics-aided geodesic device 100 calculates the intersection point of the multiple cones. Calculation of the intersection point of the multiple cones results in a set of nonlinear equations that may be solved with a variety of numerical schemes, such as Newton, quasi-Newton, and Gauss-Newton methods. Such methods are well-known and understood by those of ordinary skill in the art. For example, the equations may be solved using the methods described in Appendices A and B.

Figure 8B:
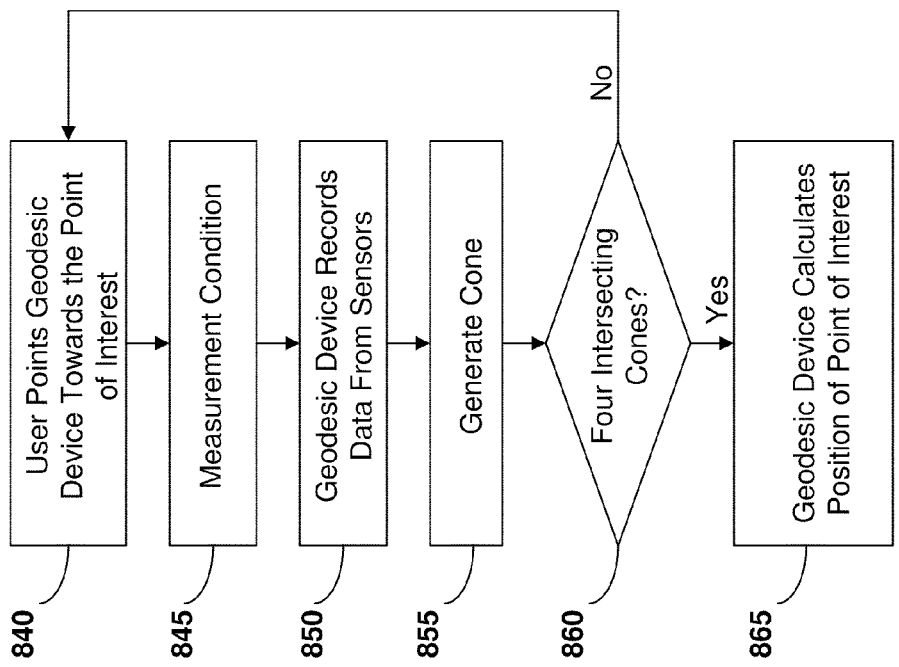
FIG. 8B illustrates another exemplary process for measuring a position using a graphics-aided geodesic device.

FIG. 8B illustrates another exemplary process 801 for measuring a position using graphics-aided geodesic device 100 and the intersection point of multiple cones technique. This process differs from that of FIG. 8A in that the device need not be positioned horizontally. However, point of interest marker 440 must be centered within a predefined threshold distance from central crosshair 450. At block 840, the process begins with the user pointing optical axis 242 of graphics-aided geodesic device 100 towards point of interest marker 440. At block 845, graphics-aided geodesic device 100 detects a measurement condition. In one example, the measurement condition may be receiving a "measure" command in response to the user pressing "measure" button 120. This is similar to block 620 of FIG. 6A. In another example, the measurement condition may be that the distance between point of interest marker 440 and center crosshair 450 falls below a predefined distance threshold. This is similar to block 660 of FIG. 6B. Upon detection of a measurement condition, the process moves to block 850. At block 850, graphics-aided geodesic device 100 records data from the sensors. For example, position data may be recorded from GNSS receiver 315, pitch and roll data may be recorded from horizon sensors 215 and 216, and image data may be recorded from video camera 140. At block 855, CPU 360 uses the position data, pitch and roll data, and image data to generate a cone as described above. Since the device may not be positioned horizontally, the apex of the cone coincides with GNSS antenna phase center 211, the cone axis is a line passing through GNSS antenna phase center 211 and orthogonal to the ground, and the angle between the cone axis and the cone surface is the total vertical deviation angle given by horizon sensors 215 and 216. At block 860, CPU 360 determines whether four intersecting cones have been generated. If there are less than four intersecting cones, the process returns to block 840. However, if there are at least four intersecting cones, the process moves to block 865. At block 865, CPU 360 of graphics-aided geodesic device 100 calculates the intersection point of the multiple cones using the methods described above.

For the exemplary processes illustrated by FIGS. 8A and 8B, the generated cones are similar to those illustrated in FIG. 7. The apex of each cone is located at either camera optical center 241 or antenna phase center 211, with the base of the cone projecting away from graphics-aided geodesic device 100 towards the ground.

In one example, when calculating the position of a point of interest using the processes illustrated by FIGS. 8A and 8B, the greater the distance between the apexes of the four cones, the greater the precision of the resulting calculated position.

Figure 9:
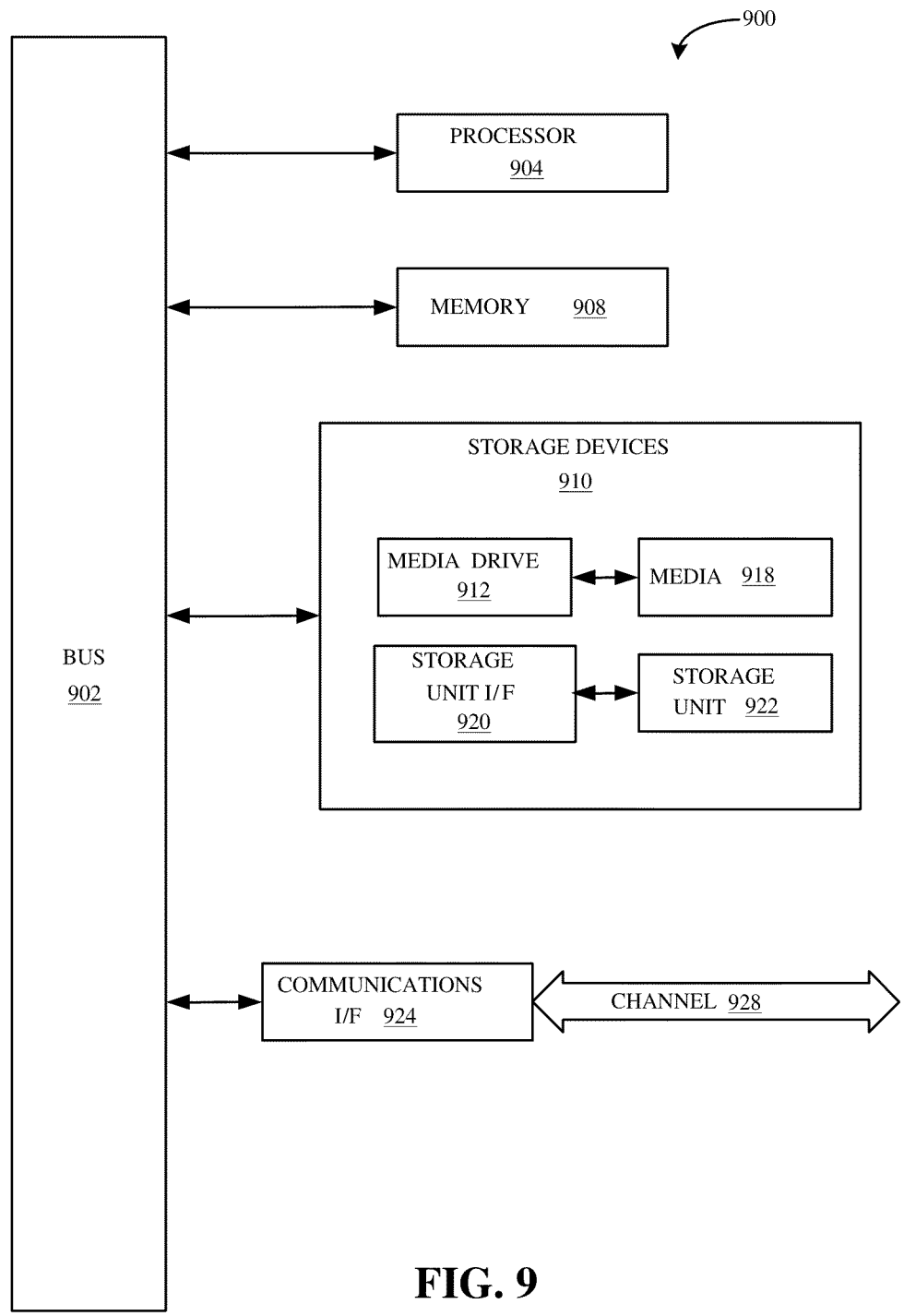
FIG. 9 illustrates a typical computing system that may be employed to implement some or all processing functionality in certain embodiments.

FIG. 9 illustrates an exemplary computing system 900 that may be employed to implement processing functionality for various aspects of the current technology (e.g., as a geodesic device, receiver, CPU 360, activity data logic/database, combinations thereof, and the like.). Those skilled in the relevant art will also recognize how to implement the current technology using other computer systems or architectures. Computing system 900 may represent, for example, a user device such as a desktop, mobile phone, geodesic device, and so on as may be desirable or appropriate for a given application or environment. Computing system 900 can include one or more processors, such as a processor 904. Processor 904 can be implemented using a general or special purpose processing engine such as, for example, a microprocessor, microcontroller or other control logic. In this example, processor 904 is connected to a bus 902 or other communication medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory ("ROM") or other static storage device coupled to bus 902 for storing static information and instructions for processor 904.

The computing system 900 may also include information storage mechanism 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 918 may include, for example, a hard disk, floppy disk, magnetic tape, optical disk, CD or DVD, or other fixed or removable medium that is read by and written to by media drive 914. As these examples illustrate, the storage media 918 may include a computer-readable storage medium having stored therein particular computer software or data.

In alternative embodiments, information storage mechanism 910 may include other similar instrumentalities for allowing computer programs or other instructions or data to be loaded into computing system 900. Such instrumentalities may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a USB port), a PCMCIA slot and card, etc. Software and data transferred via communications interface 924 are in the form of signals which can be electronic, electromagnetic, optical, or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable storage medium" may be used generally to refer to media such as, for example, memory 908, storage device 918, or storage unit 922. These and other forms of computer-readable media may be involved in providing one or more sequences of one or more instructions to processor 904 for execution. Such instructions, generally referred to as "computer program code" (which may be grouped in the form of computer programs or other groupings), when executed, enable the computing system 900 to perform features or functions of embodiments of the current technology.

In an embodiment where the elements are implemented using software, the software may be stored in a computer-readable medium and loaded into computing system 900 using, for example, removable storage drive 914, drive 912 or communications interface 924. The control logic (in this example, software instructions or computer program code), when executed by the processor 904, causes the processor 904 to perform the functions of the technology as described herein.

It will be appreciated that, for clarity purposes, the above description has described embodiments with reference to different functional units and processors. However, it will be apparent that any suitable distribution of functionality between different functional units, processors or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

APPENDIX A

Unconstrained Minimization Methods

Let:
$R^n$ be n-dimensional Euclidean space, $x=(x_1, x_2, \ldots, x_n)^T \in R^n$, where vectors are columns and the symbol $^T$ denotes transpose;
$\|x\|=\sqrt{x_1^2+x_2^2+\ldots+x_n^2}$ be an Euclidean norm of the vector $x=(x_1, x_2, \ldots, x_n)^T \in R^n$;
$\langle x, y \rangle = x^T y = y^T x$ be the scalar product of two vectors;

$$\frac{\partial f(x)}{\partial x}$$

be the vector of first partial derivatives of the continuously differentiable function $f(x)$, or the gradient vector;

$$\frac{\partial^2 f(x)}{\partial x^2}$$

be the matrix of second partial derivatives of the twice continuously differentiable function $f(x)$, or the Hesse matrix;
$R^{n \times n}$ be the space of square n×n matrices;
I be the identity matrix.
The sequence $\{x^{(k)}\}$, k=0, 1, ..., starting with initial approximation $x^{(0)}$, generated by the following equation $$x^{(k)} = x^{(k-1)} - \lambda^{(k)} B^{(k)} \frac{\partial f(x^{(k-1)})}{\partial x} \quad (A1)$$

which satisfies the minimization property $$f(x^{(k)}) < f(x^{(k-1)}) < \ldots < f(x^{(0)}) \quad (A2)$$

if the matrix $B^{(k)} \in R^{n \times n}$ is positive definite and the step length $\lambda^{(k)}$ is specially chosen. Methods for calculation of the step length are described, for example, in P. E. Gill, W. Murray, M. H. Wright (1980), *Practical Optimization, Academic Press*, 1981 pp. 100-102, which is incorporated herein by reference. Robust and practically proven methods include calculating the first number in the sequence $$\left\{ \lambda_i = \frac{1}{2^i} \right\},$$

i=0, 1, 2, . . . , satisfying the inequality $$f(x^{(k-1)} - \lambda_i p^{(k)}) - f(x^{(k-1)}) < \mu \lambda_i \left\langle p^{(k)}, \frac{\partial f(x^{(k-1)})}{\partial x} \right\rangle, \quad (A3)$$

where $$p^{(k)} = -B^{(k)} \frac{\partial f(x^{(k-1)})}{\partial x}, \quad (A4)$$

is the search (or descent) direction vector, and μ is an arbitrary number in the range $0 < \mu \le 0.5$. In one example, the value $\mu = 0.01$ may be used.

The sequence $\{x^{(k)}\}$ generated according to the expression (A1) minimizes the function $f(x)$ as shown in inequalities (A2). Thus, the equation (A1) recursively generates the minimizing sequence for any positively definite matrices chosen. The convergence properties of the sequence depend on the choice of the positive definite matrix $B^{(k)}$. The following are methods that may be used to select the positive definite matrix $B^{(k)}$ and calculate the equation (A1):

1) If $B^{(k)} = I$, the equation (A1) may be calculated using the gradient or steepest descent method. The method is known to be linearly convergent.
2) If $$B^{(k)} = \left( \frac{\partial f(x^k)}{\partial x^2} \right)^{-1},$$

the equation (A1) maybe calculated using the Newton method. The method is quadratic convergent in the neighborhood of the local minimum point where the Hesse matrix is positive definite.

3) The iteratively calculated matrices $B^{(k)}$ may be updated according to the Broyden-Fletcher-Goldfarb-Shanno (BFGS) or Davidon-Fletcher-Powell (DFP) schemes as described, for example, in P. E. Gill, W. Murray, M. H. Wright (1980), *Practical Optimization, Academic Press*, 1981, pp. 116-127, which is incorporated herein by reference. The BFGS and DFP schemes form the Quasi-Newton family of methods which are known to be super-linearly convergent. These methods are practically as fast as Newton methods, but do not demand calculation of the Hesse matrix. In applications where the Hesse matrix is easily calculated, like in the present application, Newton methods are preferable.

APPENDIX B

Sum of Squares Minimization Methods

Let us consider a particular case of the function $f(x)$ subject to minimization. Let the function $f(x)$ be the sum of squares of m functions $\phi_i(x)$:

$$f(x) = \frac{1}{2} \sum_{i=1}^{m} [\varphi_i(x)]^2 \quad (A5)$$

Solution of the redundant (if m≥n) set of nonlinear equations $$\varphi_1(x) = 0, \quad (A6)$$
$$\varphi_2(x) = 0,$$
$$\ldots$$
$$\varphi_m(x) = 0,$$

is often reduced to the minimization problem $$f(x) \to \min \quad (A7)$$

Any of the methods 1)-3) described above can be applied to the problem (A7). To apply the Newton method, the expressions for the gradient vector and Hesse matrix are needed. The following equations express them through gradients and Hesse matrices of the functions $\phi_i(x)$:

$$\frac{\partial f(x)}{\partial x} = \sum_{i=1}^{m} \varphi_i(x) \frac{\partial \varphi_i(x)}{\partial x}, \quad (A8)$$

$$\frac{\partial^2 f(x)}{\partial x^2} = \sum_{i=1}^{m} \frac{\partial \varphi_i(x)}{\partial x} \left[ \frac{\partial \varphi_i(x)}{\partial x} \right]^T + \sum_{i=1}^{m} \varphi_i(x) \frac{\partial^2 \varphi_i(x)}{\partial x^2} \quad (A9)$$

If the system (A6) is feasible, the values $\phi_i(x)$ vanish as the minimizing sequence $\{x^{(k)}\}$ converges to the solution. Even if the system (A6) is 'almost' feasible, the values $\phi_i(x)$ can be neglected in the expression for the Hesse matrix (A9). We arrive at the formulation of the fourth method:

4) If $$B^{(k)} = \sum_{i=1}^{m} \frac{\partial \varphi_i(x)}{\partial x} \left[ \frac{\partial \varphi_i(x)}{\partial x} \right]^T,$$

the equation (A1) maybe calculated using the Gauss-Newton method, for example, as described in P. E. Gill, W Murray, M. H. Wright (1980), *Practical Optimization, Academic Press*, 1981, pp. 134-136, which is incorporated herein by reference.

APPENDIX C

Let the cone $C_i$ in three dimensional space be defined by its apex $a_i \in R^3$, central axis $h \in R^3$, common for all m cones, and the angle δ between the axis and the generating line. The vector h is a unit vector aligned with the gravity vector. The equation of the cone $C_i$ takes the form:

$$\frac{\langle h, x - a_i \rangle}{\|h\| \|x - a_i\|} = \cos\delta. \quad (A10)$$

Let us denote α=cos δ. Then taking into account that the vector h is a unit vector, we arrive at the following equation $$\langle h, x-a_i \rangle - \alpha\|x-a_i\| = 0 \quad (A11)$$

The point $x \in R^3$ belongs to the surface of the cone $C_i$ if and only if it satisfies the equation (A11). The problem of determining the intersection of cones is reduced to the solution of the problem (A6) with $\phi_i(x) = \langle h, x-a_i \rangle \alpha_i \|x-a_i\|$. The problem is then reduced to the problems (A5) and (A7), which in turn, can be solved by any of the methods 1)-4) described above. To apply, for example, the Newton method, we need to calculate the gradient and Hesse matrix (A8) and (A9), respectively. To complete the description, we derive expressions for $$\frac{\partial \phi_i(x)}{\partial x} \text{ and } \frac{\partial^2 \phi_i(x)}{\partial x^2}$$

needed for calculations (A8) and (A9):

$$\frac{\partial \phi_i(x)}{\partial x} = h - \frac{\alpha_i}{\|x-a_i\|}(x-a_i),$$

$$\frac{\partial^2 \phi_i(x)}{\partial x^2} = \frac{\alpha_i}{\|x-a_i\|}\left(\frac{1}{\|x-a_i\|^2}(x-a_i)(x-a_i)^T - I\right).$$

What is claimed is:

1. A computer-implemented method of determining a position of a point of interest using a device having an antenna, a downwardly facing image sensor, at least one orientation sensor and a display, said method comprising:
   positioning the device above the point of interest so the point of interest is captured by the downwardly facing image sensor;
   receiving, at the antenna, position data from a plurality of satellites;
   receiving image data from the downwardly facing image sensor, said image data including the point of interest;
   receiving orientation data from the at least one orientation sensor, said orientation data corresponding to the pitch and roll of the device with respect to the horizon;
   displaying on the display a representation of the image data and a representation of the orientation data to assist a user in positioning the device;
   determining an angle between a reference line and a vector pointing to the point of interest based on the image data;
   generating a mathematical representation of a first cone based on the position data and the orientation data, wherein the first cone comprises an axis and a surface, and wherein an angle between the axis and the surface corresponds to the angle between the reference line and the vector pointing to the point of interest; and
   determining the geographical position of the point of interest using a cone intersection algorithm on a set of multiple cones, wherein the set of multiple cones includes the first cone.

2. The method of claim 1, wherein:
   an apex of the first cone corresponds to a position of an optical center of the downwardly facing image sensor; and
   the reference line corresponds to an optical axis of the downwardly facing image sensor.

3. The method of claim 1, wherein:
   an apex of the first cone corresponds to a position of an antenna phase center of the antenna.

4. The method of claim 1, wherein determining the position of the point of interest is in response to receiving a measurement command.

5. The method of claim 1, wherein the method further comprises tracking a location of the point of interest in the display using the image data, and wherein determining the position of the point of interest is in response to:
   the location of the point of interest in the display being within a predetermined distance from a predetermined point in the display; and
   the orientation data being within a predetermined range of values.

* * * * *